Feb. 20, 1945.  I. SHAMAH  2,369,922
AIRCRAFT COURSE RECORDER
Filed May 22, 1943  2 Sheets-Sheet 1
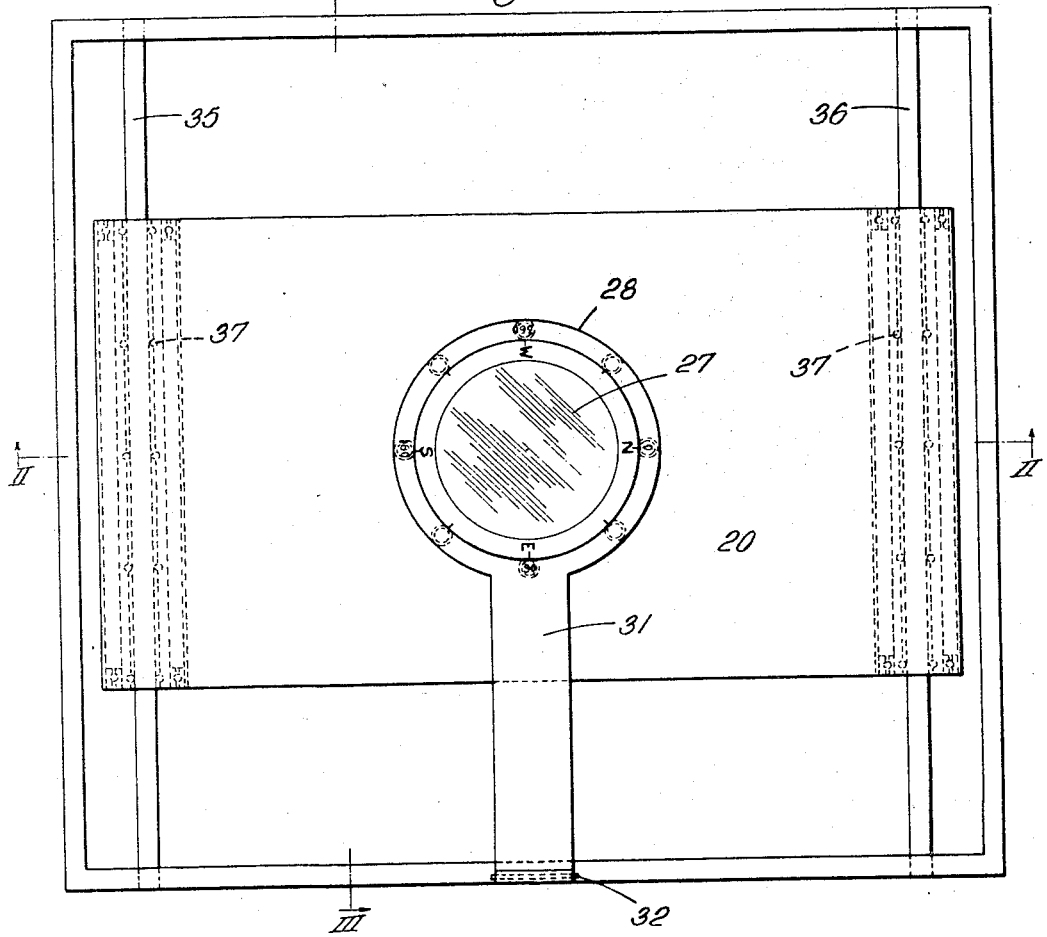
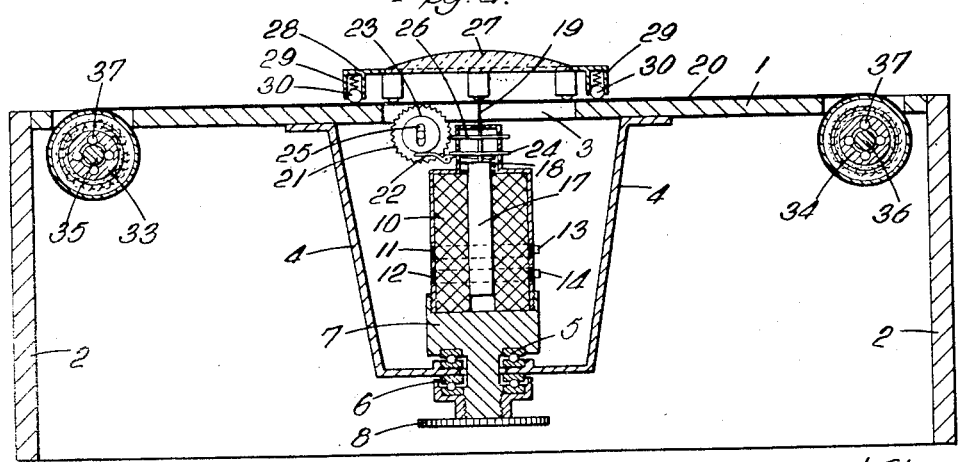
Israel Shamah
INVENTOR

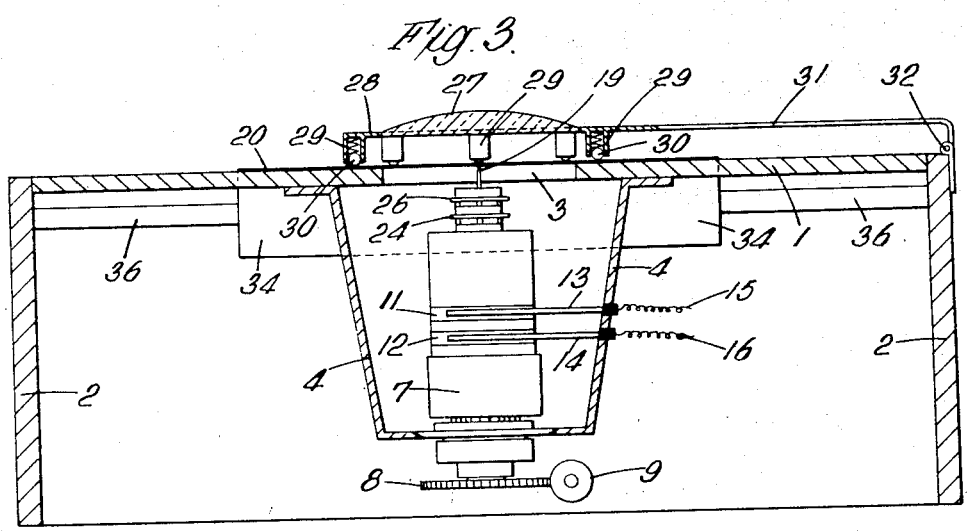
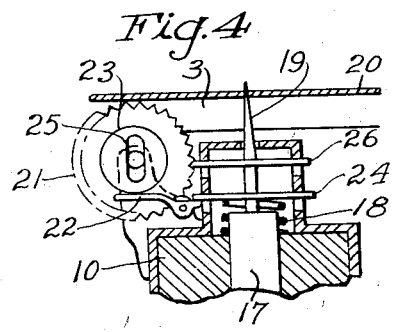

UNITED STATES PATENT OFFICE 2,369,922

AIRCRAFT COURSE RECORDER

Israel Shamah, London, England

Application May 22, 1943, Serial No. 488,060
In Great Britain May 29, 1942

1 Claim. (Cl. 234—26)

This invention relates to mechanisms for exhibiting and recording the course flown by an aircraft and particularly for exhibiting its position at any given moment during flight and for forming permanent record of certain flight data.

According to the present invention, a map is automatically turned in conformity with variations in compass bearings and is moved in timed relation with the movement of the aircraft through the air such that the map is moved past a given point in a direction corresponding to the direction of flight at a rate proportional to the speed.

Further, according to the present invention, the map is either continuously or intermittently marked to make a permanent record thereon of the position of the point about which it is moved so that not only will it be possible to observe the position of the aircraft but a permanent record will be obtained of the course flown.

Still further, according to the present invention the map is turned and moved to provide compensation for error due to the direction and speed of the wind.

The apparatus, according to the present invention consists of a platform on which a map may be mounted, a device for causing movement of the map, means for operating the motivating means to move the map at a rate proportional to the speed of the aircraft through the air, and means for varying the direction in which the motivating means moves the map in conformity with variations in the compass bearing. The apparatus may also include means for moving the map in a direction corresponding to the direction of the wind and at a rate proportional to the speed thereof.

The apparatus conveniently has means for maintaining the map on the platform arranged to permit the motivating means to move the map without impeding the operation and without impairing free observation of the map. These means may carry attention directing means such as a magnifying glass for magnifying the particular portion of the map which is at any given moment situated at the point about which the map is moved and turned by the motivating means.

The marking of the map to indicate the position of the aircraft and for indicating the course flown, conveniently comprises a needle operable to perforate the map, in which case the motivating means are desirably intermittently operated and the needle is brought into operation during the time that the map is stationary.

In order that the invention may be clearly understood and readily carried into effect an embodiment thereof is hereinafter more fully described with reference to the accompanying drawings which are given for purposes of illustration only and not of limitation.

In these drawings:

Figure 1 is a plan view of the apparatus,

Figure 2 is a section on the line II—II of Figure 1, and

Figure 3 is a section on the line III—III of Figure 1.

Figure 4 is a partial view of the upper central portion of Figure 2 on a larger scale.

Referring now to the said drawings, a map supporting platform 1 having a depending wall 2 is mounted in a convenient position, for example, in a horizontal position on a navigation table (not shown) or in a vertical or other convenient position readily visible to the pilot or navigator. An aperture 3 is provided at the centre of the platform 1 and on the opposite or under side of the platform there is mounted a rigid spider or casing 4 arranged to support through the medium of antifriction means, such as ball bearings 5, 6 a rotatable element 7 rotatable about an axis which extends at right angles to the plane of the platform. The rotatable element 7 has fast therewith a gear wheel 8 with which meshes a worm gear 9 rotated by a repeater motor operated from the compass or directly by the master compass. The ratio of the drive from the compass to the gear wheel is strictly 1:1 so that the rotatable element 7 moves with the compass indicator to the same extent as well as in the same direction. The rotatable element 7 contains or has fast therewith a solenoid 10 (Figure 2), the ends of the winding of which are taken to two contact rings 11, 12 with which engage brushes 13, 14 mounted on the spider or casing 4 whereby as the rotatable element 7 is rotated with variations in the compass bearing, the brushes 13, 14 will at all times be in contact with the contact rings 11, 12 to make electrical connection with the winding of the solenoid 10. The brushes 13, 14 are connected by leads 15, 16 to means imparting electrical impulses corresponding to distances travelled by the aircraft. Such impulses may be an arbitrary indication dependent on the known speed of the aircraft or may be impulses given out in known manner by or under the control of an air speed indicator. The armature 17 of the solenoid 10 is spring loaded by a spring 18 and carries a needle 19 which will normally extend through a map 20 lying on the platform 1. When an electrical impulse is imparted to the solenoid 10 the latter functions to pull its armature 17 downwards and so retract the needle 19.

Mounted for rotation with the rotatable element 7 is at least one feed wheel 21 comprising a sharp toothed wheel, whose periphery lies in the aperture 3 but is normally located out of contact with the back of the map 20 on the platform 1. The arrangement is such that on initial downward movement of the armature 17 the feed wheel 21 is lifted into contact with the map 20 and on further downward movement of the armature, it is advanced through a predetermined angle to cause a corresponding movement of the map. This is accomplished by means of a pivoted trip lever 22 one arm of which supports a flange 23 on the feed wheel 21, while its other arm cooperates with a bar 24 carried by the needle 19 so that when the latter is drawn down, the bar 24 will rock the lever 22 and cause it to elevate the feed wheel 21 about a floating pivot 25 whilst the further downward movement of the needle 19 will cause a second bar 26 on the needle 19 to engage a tooth of the feed wheel 21 and to advance it by one tooth, the extent of this movement being say a hundredth of an inch.

The map 20 is maintained in position on the platform 1 by means which will not impede its movement. These means may comprise a sheet of glass or a magnifying glass 27 in a frame 28 supported on legs 29 having balls or similar freely rotatable elements 30 adapted to bear lightly on the map and press it against the platform 1 around the edges of the aperture 3 therein. The upper surface of the frame 28 may be provided with compass bearings or at least a scale of degrees substantially as shown in Figure 1. The frame 28 is desirably carried at the end of an arm 31 which is pivoted at 32 to the edge of the platform so that the frame 28 and magnifying glass 27 may be lifted out of contact with the map 20 whilst the arm 31 also prevents displacement of the magnifying glass 27 and its frame 28 due to movement of the map 20.

Where the map is smaller than the size of the platform 1, it may be simply laid thereon, but where the map is elongated it is wound on a pair of rollers 33, 34 which are freely rotatable as well as axially displaceable on shafts 35, 36 respectively. Ball bearings 37 are provided to reduce friction in rotation of the rollers as well as their axial displacement on their respective shafts 35, 36.

The mechanism described above works as follows:

The map 20 is positioned on the platform 1 with the point of departure pierced by the needle 19. As the aircraft proceeds on its travel, an electrical impulse will be given once every mile or multiples of a mile, say ten miles, which impulse fed to the solenoid 10 will cause attraction of its armature 17 thereby retracting the needle 19 and causing the feed wheel 21 to advance due to the action of the disc 24 and move the map an extent equivalent to the distance travelled. On the spring 18 returning the armature 17 to its original position, the needle 19 will again pierce the map 20 to show the new position. If the air craft changes its direction, the worm gear 9 will rotate the gear wheel 8 and hence the rotatable element 7 to move round the feed wheel 21 so that during its next operation it will move the map in a different direction. If it is desired to correct the position indication to compensate for drift, the map may be lifted and replaced.

Naturally, the scale of the map will be adapted to the scale of movement of the feed wheel 21. Furthermore, the map will be such that the longitudinal lines meet at the pole and therefore there is no necessity for any latitude correction. Should the course cover more than one map, a new map may be substituted at the appropriate time.

The indicator is not only useful for indicating the exact position of the aircraft but is a useful record of the actual course flown. Thus, for example, during engagement with the enemy or for other causes, the navigator or pilot may not be able to keep a record of his position and the course flown and therefore the device will not only be most useful in establishing his position but also in giving an indication of the ground overflown.

The mechanism is of simple construction and may be robust and capable of giving a reliable indication with little possibility of mechanical failure such as might be the case with more complicated apparatus. Variations may be made in the exact design of instrument without however departing from its broad principles.

I claim:

An apparatus, for exhibiting and recording on a map the course flown by an aircraft, said apparatus comprising a platform for supporting said map, a feed wheel normally disposed below said platform and capable of acting through an aperture in the latter for advancing said map past a given point, an axially displaceable needle supported below said platform and normally held in a position in which its tip perforates said map at said given point, means for intermittently displacing said needle downwardly at intervals in timed relation to the speed of travel of the aircraft, lifting means for bringing said feed wheel into contact with said map, means on said needle for actuating said lifting means at the beginning of each downward displacement of said needle, means also on said needle for engaging said feed wheel to rotate it through a certain angle at a subsequent stage of each downward displacement of said needle, support means rotatable about an axis passing through said given point for said feed wheel and lifting means, and means for rotating said support means in conformity with changes in compass bearing.

ISRAEL SHAMAH.